US012361290B2

(12) United States Patent
Specia et al.

(10) Patent No.: US 12,361,290 B2
(45) Date of Patent: Jul. 15, 2025

(54) MULTI-TASK NEURAL NETWORK FOR TOXICITY DETECTION

(71) Applicant: CONTEXAI LTD., London (GB)

(72) Inventors: Lucia Specia, London (GB); Marina Fomicheva, Barcelona (ES); Ozan Caglayan, London (GB); Zhenhao Li, London (GB)

(73) Assignee: CONTEXAI LTD., London (GB)

( * ) Notice: Subject to any disclaimer, the term of this patent is extended or adjusted under 35 U.S.C. 154(b) by 276 days.

(21) Appl. No.: 18/210,731

(22) Filed: Jun. 16, 2023

(65) Prior Publication Data

US 2023/0419117 A1    Dec. 28, 2023

(30) Foreign Application Priority Data

Jun. 23, 2022   (GB) .................................... 2209203

(51) Int. Cl.
*G06N 3/084*      (2023.01)
*G06F 40/30*      (2020.01)
*G06N 3/0455*     (2023.01)

(52) U.S. Cl.
CPC ............ *G06N 3/084* (2013.01); *G06F 40/30* (2020.01); *G06N 3/0455* (2023.01)

(58) Field of Classification Search
CPC ...... G06N 3/084; G06N 3/0455; G06N 3/044; G06N 3/045; G06N 3/0464; G06N 3/048; G06N 3/082; G06N 3/094; G06F 40/30; G06F 40/20; G06F 16/30; G06F 16/35; H04L 51/21
See application file for complete search history.

(56) References Cited

U.S. PATENT DOCUMENTS

| | | |
|---|---|---|
| 2020/0125928 A1 | 4/2020 | Doyle |
| 2020/0250267 A1 | 8/2020 | Argawal et al. |
| 2020/0320769 A1* | 10/2020 | Chen ..................... G06F 18/214 |
| 2024/0062525 A1* | 2/2024 | Tai .......................... G06N 3/08 |

OTHER PUBLICATIONS

Abburi, Identifying and Analyzing the Discriminatory Content in Social Web, International Institute of Information Technology, Jun. 2022 (Year: 2022).*
Aldjanabi et al, Arabic Offensive and Hate Speech Detection Using a Cross Corpora Multi-Task Learning Model, Oct. 8, 2021, Informatics 2021, pp. 1-13 (Year: 2021).*
Faal et al, Domain Adaptation Multi-task Deep Neural Network for Mitigating Unintended Bias in Toxic Language Detection, In Proceedings of the 13th international Conference on Agents and Artificial Inteligence (ICAART 2021) vol. 2, pp. 932-940 (Year: 2021).*

(Continued)

*Primary Examiner* — Linda Wong
(74) *Attorney, Agent, or Firm* — Hunton Andrews Kurth LLP

(57) ABSTRACT

This specification provides a computer-implemented method for detecting toxic user-generated textual content. The method comprises obtaining input data comprising a representation of user-generated textual content. A toxicity prediction and a prediction for each of one or more attributes for the user-generated textual content are generated by processing the input data using a multi-task neural network.

12 Claims, 7 Drawing Sheets

(56) References Cited

OTHER PUBLICATIONS

Sahana et al, Towards a Safer Conversation Space: Detection of Toxic Content in Social Media (Student Consortium), 2020 IEEE Sixth International Conference on Multimedia Big Data (BigMM), pp. 297-301 (Year: 2020).*

UK Intellectual Property Office, GB Patent Application No. 2209203.5, Patents Act 1977: Search Report Under Section 17, Dec. 13, 2023, pp. 1-4.

* cited by examiner

MULTI-TASK NEURAL NETWORK FOR TOXICITY DETECTION

CROSS REFERENCE TO RELATED APPLICATIONS

This patent application claims priority to UK Patent Application No. 2209203.5, filed Jun. 23, 2022, the disclosure of which is hereby incorporated by reference in its entirety.

BACKGROUND

Detecting toxic content is an important task in many areas, such as interactive platforms where users can engage with each other. It is desirable to provide systems and methods that can more accurately detect a wide range of toxic content (e.g. cases of covert toxicity) in a flexible and interpretable manner.

SUMMARY

In accordance with a first aspect, this specification provides a computer-implemented method for detecting toxic user-generated textual content. The method comprises obtaining input data comprising a representation of user-generated textual content. A toxicity prediction and a prediction for each of one or more attributes for the user-generated textual content are generated by processing the input data using a multi-task neural network. The processing comprises generating an initial encoding for the user-generated textual content, comprising processing the input data using an initial encoder of the multi-task neural network. A toxicity feature representation is generated, comprising processing the initial encoding using a task-specific toxicity feature extractor of the multi-task neural network. An attribute feature representation is generated for each of the one or more attributes, comprising, for each attribute, processing the initial encoding using a respective task-specific attribute feature extractor of the multi-task neural network associated with the attribute. A common feature representation is generated, comprising processing the initial encoding using a task-common feature extractor of the multi-task neural network. A plurality of combined feature representations are generated, comprising combining each of the toxicity feature representation and the one or more attribute feature representations with the common feature representation. The toxicity prediction is generated by processing, using a toxicity output portion of the multi-task neural network, the combined feature representation formed from combining the toxicity feature representation with the common feature representation. The prediction for each of the one or more attributes is generated by processing, using a respective output portion of the multi-task neural network associated with the attribute, the combined feature representation formed from combining the attribute feature representation for the attribute with the common feature representation.

The method may further comprise flagging a post comprising the user-generated textual content for moderation based on the toxicity prediction and/or the prediction for one or more of the attributes.

The toxicity prediction may comprise a score indicating a probability of toxicity for the user-generated textual content. The method may further comprise storing a plurality of posts comprising user-generated textual content in a moderation queue. Posts may be ranked in the moderation queue by the score for the toxicity prediction generated by the multi-task neural network.

The one or more attributes for the user-generated textual content may comprise a representation for one or more of: presence of profanity; topic class; sentiment; group identity class; presence of a joke; presence of sarcasm; and/or presence of an idiom.

The initial encoder may comprise a pre-trained Transformer-based language model.

One or more of the task-specific feature extractors, the task-common feature extractor, and the output portions may comprise one or more feedforward blocks. Each feedforward block may comprise a linear projection layer, a non-linear activation function, and a dropout layer.

In accordance with a second aspect, this specification provides a computing system to train a multi-task neural network to perform toxicity detection of user-generated textual content. The computing system is configured to obtain one or more training examples. Each training example comprises input data comprising a representation of user-generated textual content and a target output for each of one or more tasks out of a plurality of tasks. Each of the plurality of tasks is to identify a respective attribute in user-generated textual content, one of the attributes being toxicity. The computing system is configured to perform a training step to train the multi-task neural network on a current task of the plurality of tasks, comprising for each of the training examples: generating an initial encoding for the user-generated textual content. This comprises processing the input data using an initial encoder of the multi-task neural network. Performing the training step further comprises generating an attribute feature representation for each of the plurality of attributes. This comprises processing the initial encoding using a respective attribute feature extractor of the multi-task neural network associated with the attribute. One of the attribute feature representations is a current task attribute feature representation for the current task that is generated by a current task attribute feature extractor. Performing the training step further comprises generating a common feature representation. This comprises processing the initial encoding using a task-common feature extractor of the multi-task neural network. Performing the training step further comprises generating a task discriminator output representing a prediction of which task the multi-task neural network is currently being trained to perform in the training step. This comprises processing the common feature representation using a gradient reversal layer and a task discriminator. Performing the training step further comprises generating a combined feature representation. This comprises combining the current task attribute feature representation with the common feature representation. Performing the training step further comprises generating, by an output portion of the multi-task neural network associated with the current task, a plurality of outputs for the current task. The plurality of outputs comprises: a specific output generated by processing the current task attribute feature representation; a combined output generated by processing the combined feature representation; and one or more adversarial outputs. Each adversarial output is generated by processing an attribute feature representation that is not the current task attribute feature representation using a gradient reversal layer. Performing the training step further comprises updating parameters of the multi-task neural network to: (i) minimize a measure of difference between the specific output and the target output for the current task (ii) minimize a measure of difference between the combined output and the target output for the current task, (iii) maximize a measure of difference between each of the one or more adversarial outputs and the target output for the current task, and (iv) maximize a measure of difference between the task discriminator output and a current task identifier indicating the current task.

Generating, by an output portion of the multi-task neural network associated with the current task, a plurality of outputs for the current task may further comprise generating a common output, comprising processing the common feature representation with the output portion of the multi-task neural network associated with the current task. Updating parameters of the multi-task neural network may further comprise updating parameters of the multi-task neural network to minimize a measure of difference between the common output and the target output for the current task.

The computing system may be further configured to update parameters of the task discriminator to minimize the measure of difference between the task discriminator output and the current task identifier.

Updating parameters of the multi-task neural network to minimize the measure of difference between the specific output and the target output for the current task may comprise updating parameters of the current task attribute feature extractor and the output portion of the multi-task neural network associated with the current task.

Updating parameters of the multi-task neural network to minimize the measure of difference between the combined output and the target output for the current task may comprise updating parameters of the current task attribute feature extractor and the task-common feature extractor.

Updating parameters of the multi-task neural network to maximize the measure of difference between each of the one or more adversarial outputs and the target output for the current task may comprise updating parameters of each of the attribute feature extractors that are not the current task attribute feature extractor.

Updating parameters of the multi-task neural network to maximize the measure of difference between the task discriminator output and the current task identifier indicating the current task may comprise updating parameters of the task-common feature extractor.

In accordance with a third aspect, this specification provides a non-transitory computer-readable medium storing instructions, which when executed by a processor, cause the processor to: obtain input data comprising a representation of user-generated textual content; and generate a toxicity prediction and a prediction for each of one or more attributes for the user-generated textual content by processing the input data using a multi-task neural network. The processing comprises: generating an initial encoding for the user-generated textual content, comprising processing the input data using an initial encoder of the multi-task neural network; generating a toxicity feature representation, comprising processing the initial encoding using a task-specific toxicity feature extractor of the multi-task neural network; generating an attribute feature representation for each of the one or more attributes, comprising, for each attribute, processing the initial encoding using a respective task-specific attribute feature extractor of the multi-task neural network associated with the attribute; generating a common feature representation, comprising processing the initial encoding using a task-common feature extractor of the multi-task neural network; generating a plurality of combined feature representations, comprising combining each of the toxicity feature representation and the one or more attribute feature representations with the common feature representation; generating the toxicity prediction by processing, using a toxicity output portion of the multi-task neural network, the combined feature representation formed from combining the toxicity feature representation with the common feature representation; and generating the prediction for each of the one or more attributes by processing, using a respective output portion of the multi-task neural network associated with the attribute, the combined feature representation formed from combining the attribute feature representation for the attribute with the common feature representation.

The one or more attributes for the user-generated textual content may comprises a representation for one or more of: presence of profanity; topic class; sentiment; group identity class; presence of a joke; presence of sarcasm; and/or presence of an idiom.

A post comprising the user-generated textual content for moderation may be flagged based on the toxicity prediction and/or the prediction for one or more of the attributes.

The toxicity prediction may comprise a score indicating a probability of toxicity for the user-generated textual content. A plurality of posts comprising user-generated textual content may be stored in a moderation queue. The posts may be ranked in the moderation queue by the score for the toxicity prediction generated by the multi-task neural network.

DETAILED DESCRIPTION

Figure 1:
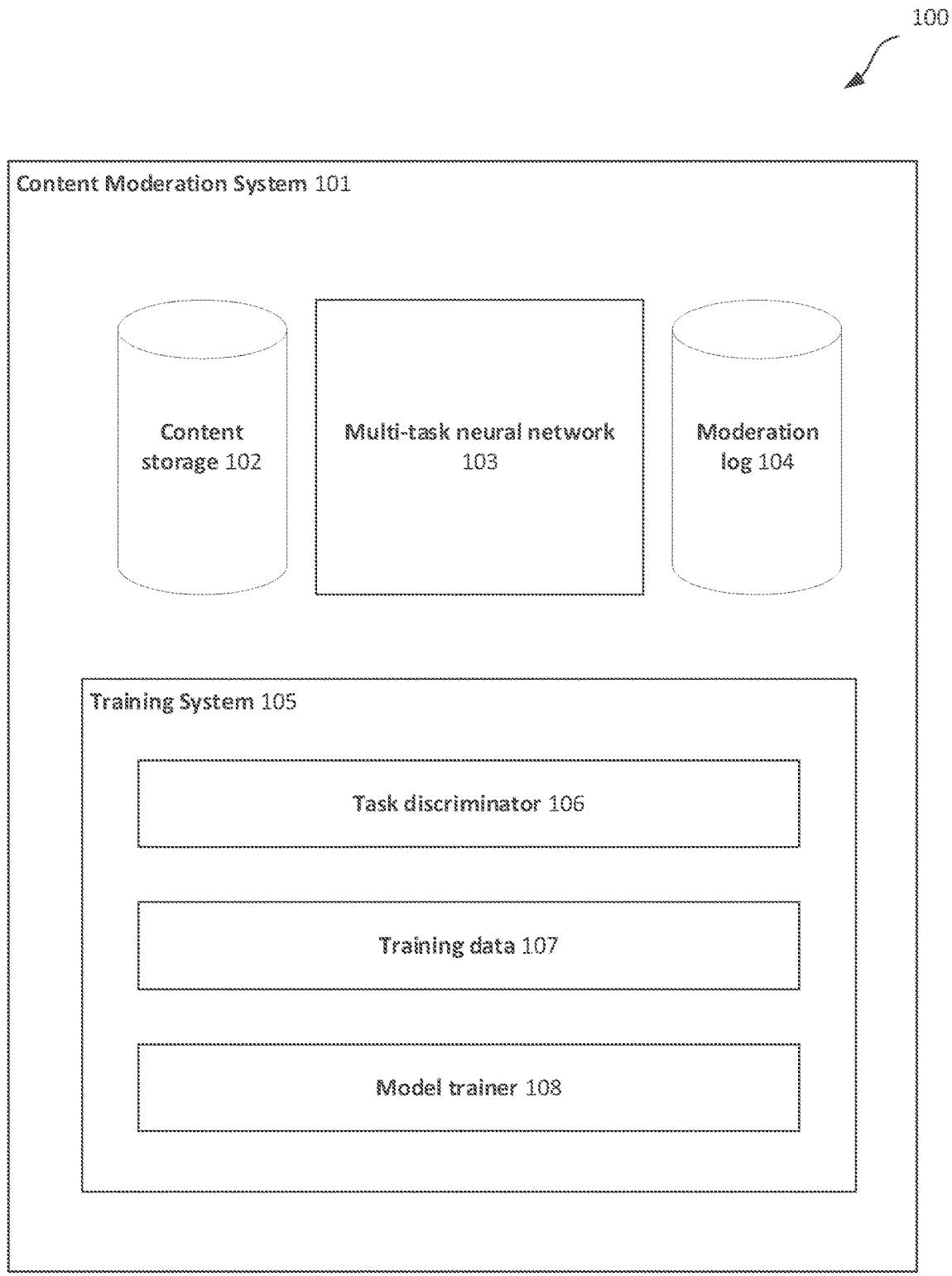
FIG. 1 is a schematic block diagram illustrating an example of a content moderation system.

Example implementations provide systems and methods for providing a multi-task neural network to perform toxicity detection of user-generated textual content. The textual content may for example be a "post", wherein a post may comprise a piece of writing shared online, e.g. on a social media platform. The systems and methods described in this specification can more accurately detect a wide range of toxic written content, reducing the number of false positives predicted compared to existing approaches, while being able to detect more covert/nuanced cases of toxicity. Reducing the number of false positives predicted may reduce the amount of data that needs to be stored in computing systems, e.g. content moderation systems. For example, online platforms may provide a combination of automated moderation and manual moderation performed by humans. In these applications, certain posts comprising user-generated textual content may be flagged and stored as part of a moderation log for manual review if determined to be toxic by the automated systems. Thus by reducing the number of false positives identified (e.g. posts incorrectly predicted to be toxic), the methods and systems described herein enable the utilization of fewer computing resources (e.g. storage, networking) in a content moderation system compared to previous approaches. In addition, being able to detect more covert/nuanced cases of toxicity decreases the number of false negative cases (e.g. posts incorrectly predicted to be non-toxic), increasing the safety of users, e.g. those engaging as part of an interactive platform.

The methods and systems described herein also provide a flexible and interpretable approach to toxicity detection through use of a trained multi-task neural network. In addition to the task of detecting toxicity, the multi-task neural network is trained to identify one or more attributes of user-generated textual content as additional tasks. For example, the multi-task neural network may predict whether there is profanity in the user-generated textual content, the identity of any groups that the content is directed towards, the presence of sarcasm, and/or any other attribute that may be useful to determine when performing toxicity detection. Thus a decision on whether a post comprising user-generated textual content is toxic can be made based on human-interpretable factors in addition to the toxicity prediction, and this decision-making process can be adjusted e.g. to reflect varying needs of different interactive platform providers. For example, any user-generated textual content predicted to be toxic over a certain probability threshold, that is also predicted to be directed towards one or more particular groups (e.g. based on sex, gender, race), may be automatically removed by a content moderation system utilizing the multi-task neural network disclosed herein. As another example, for another platform, posts determined to express negative sentiment towards a particular topic may be flagged for manual review.

Existing approaches to performing toxicity detection generally fall in two categories: (i) keyword-based approaches utilizing a lexicon, which check for the presence of words in the lexicon in posts, and (ii) machine-learning approaches. Determining a suitable lexicon for keyword-based approaches is difficult: if the lexicon is large then many posts are incorrectly predicted to be toxic, requiring excessive storage, manual review, and/or deletion of many non-toxic posts. If the lexicon is limited, then many cases of toxic content may be missed. In addition, keyword-based approaches disregard the context in which words are used, which can lead to many false positives, as well as missed cases of toxicity that do not use toxic words, leading to many false negatives. Machine learning approaches have the potential to mitigate some of these problems by processing text beyond keywords. However, because of the simplistic way in which they are trained, existing machine-learning approaches tend to suffer from similar drawbacks as keyword-based approaches, for example by learning spurious correlations leading to many false positives (e.g. falsely predicting that any textual content containing profanity is toxic), and/or being unable to identify cases of covert toxicity (e.g. as a result of only being trained to detect toxicity).

The systems and methods disclosed herein for performing toxicity detection overcome these disadvantages by training a multi-task neural network to perform several related tasks, while mitigating potential biases in toxicity detection by disentangling task-specific information. In particular, during training of the multi-task neural network, the training process makes use of one or more adversarial losses to train the multi-task neural network to generate task-specific attribute feature representations that only capture aspects of a particular task (i.e. without capturing aspects relating to the other tasks). By disentangling task-specific representations in this way, the disclosed systems and methods remove unwanted biases in toxicity detection (e.g. falsely predicting that any textual content containing profanity is toxic). In addition, certain feature representations are shared between each of the tasks, using a task discrimination loss in training to improve performance (e.g. accuracy) in toxicity detection by sharing information that is useful for all of the tasks.

FIG. 1 is a schematic block diagram illustrating an example 100 of a content moderation system 101. Content moderation system 101 comprises a content storage 102, a trained multi-task neural network 103, a moderation log 104, and a training system 105 used/accessed for training/updating the multi-task neural network 103. Each of the components illustrated in the example content moderation system 101 may be implemented on the same computing device and/or may be shared between different computing devices. For example, training system 105 may be implemented on one or more computing devices separate to the computing devices used to implement the other components of the system 101.

Content storage 102 contains a number of user posts comprising user-generated textual content. As an example, content storage 102 may be updated continually (e.g. periodically) as users post on an interactive platform. Each user post stored in content storage 102 may be associated with various data, including metadata such as the time/date of the post, a location for the post, and other contextual information such as an identifier of another post to which the post replied. The content storage 102 may also indicate whether a post required any action, such as a moderator review, deletion, etc. The posts may be stored in content storage 102 in any suitable format, e.g. in a key-value store, a database, etc. and may or may not be compressed.

The trained multi-task neural network 103 is used to detect toxic posts stored in the content storage 102. A toxic post is a post that is considered abusive, hateful, offensive, and/or harmful to an individual, a group of people, or the general public. Input data for the multi-task neural network 103 may be determined for new posts written to the content storage 102, and a toxicity prediction, in addition to a prediction for one or more other attributes for the post, is generated by the multi-task neural network 103 for the new posts. The toxicity prediction may be a score or probability indicating how likely the post is considered to be toxic. In other implementations, the toxicity prediction may be a binary output indicating either that a post is toxic or non-toxic. In some implementations, the content moderation system 101 may be configured so that the multi-task neural network 103 generates predictions for posts before they are stored in content storage 102.

Figure 2A:
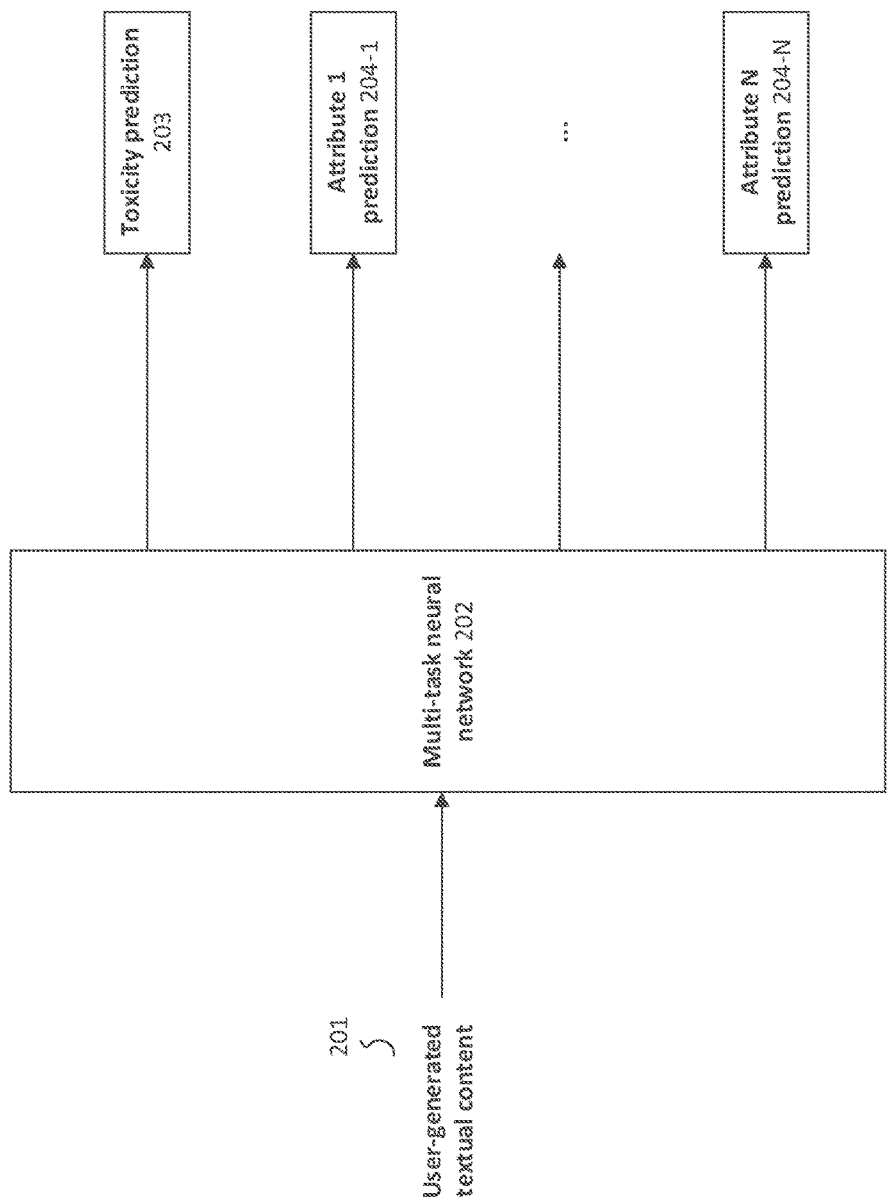
FIGS. 2A and 2B each illustrate an example method of using a multi-task neural network for toxicity detection.
Figure 2B:
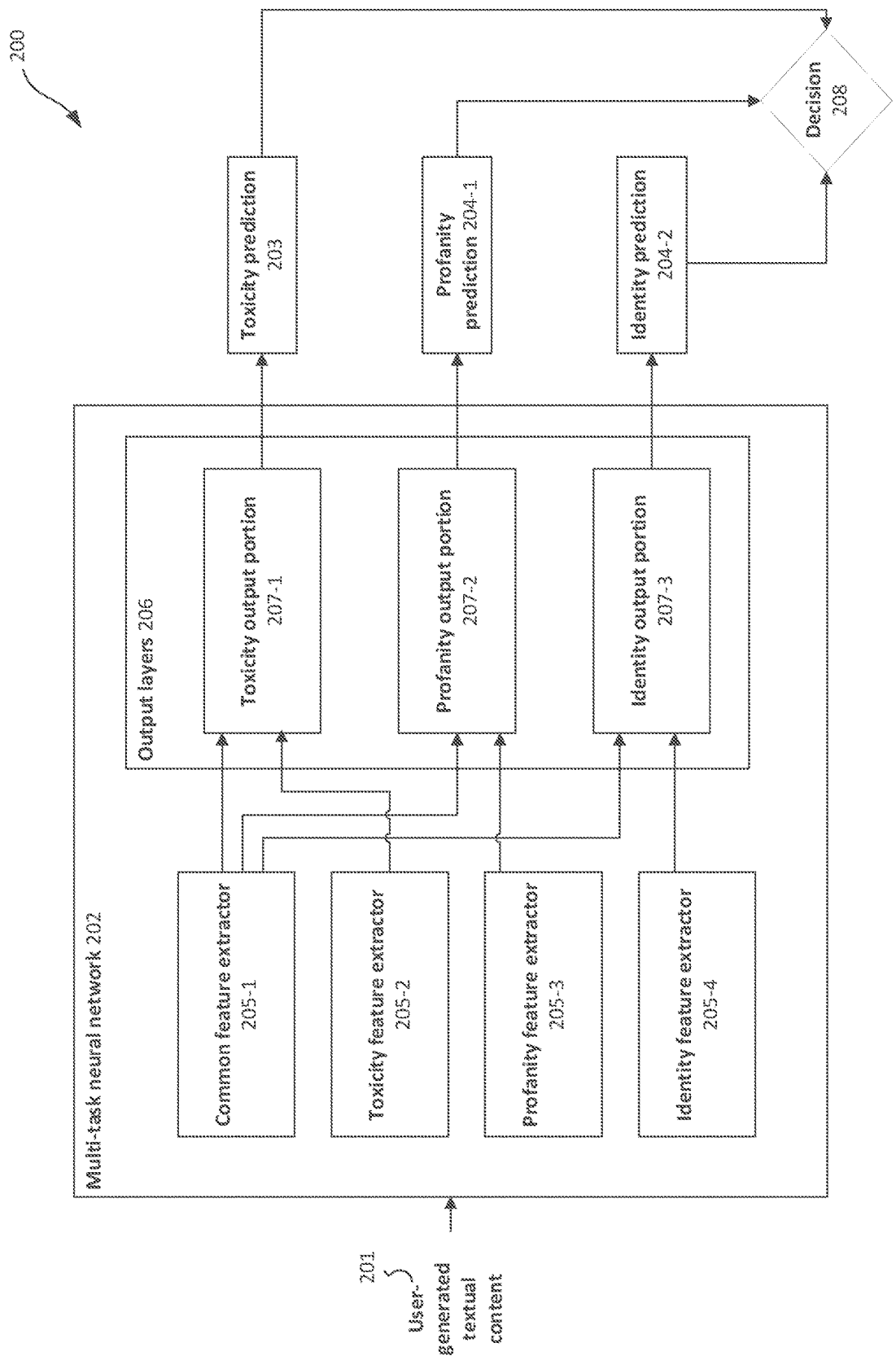

The processing of input data by the trained multi-task neural network 103 to generate toxicity predictions and predictions for each of one or more attributes for the post is described in greater detail in relation to FIGS. 2A and 2B.

Pre-processing of posts may be performed to form the input data for multi-task neural network 103. This may include tokenization of the user-generated textual content, including the addition of reserved tokens which are processed to generate a fixed-length representation (e.g. a vector of a particular size) of the textual content, sequence padding using reserved padding tokens, sequence trimming to fit a desired sequence length, and/or any other suitable pre-processing operation. Generally, the input data to the multi-task neural network 103 is a sequence of vectors, each vector corresponding to a particular token of the textual content and one or more reserved tokens if appropriate. The tokens of the textual content may correspond to any suitable constituent of the textual content, e.g. words, characters, morphemes, etc. Each vector of the sequence may be of the same size/dimension, and a matrix formed from the vectors may be used to represent the textual content. Similarly, pre-processing may be performed to provide training examples of training data 107.

Depending on the outputs generated for the post by the multi-task neural network 103, a post may be added to moderation log 104. The moderation log 104 comprises a number of posts that are determined to require an action such as deletion or manual review. The moderation log 104 may store the outputs generated by the multi-task neural network 103 for the post, and/or data derived therefrom, in addition to data identifying the post.

The content moderation system 101 may be configured to add posts to moderation log 104 based on the generated outputs, e.g. by making a determination whether the generated outputs satisfy one or more sets of criteria. For example, a post may be added to moderation log 104 if a score for the generated toxicity prediction is above a threshold. As described previously, in addition to detecting toxicity, the multi-task neural network 103 is configured to identify one or more other attributes of the post as additional tasks. For example, the multi-task neural network 103 may be configured to predict whether there is profanity in the post, whether the post is sarcastic, whether the post is directed to any particular group/identity of people etc. Continuing the example, the content moderation system 101 may be configured to add a post to moderation log 104 if the outputs of the multi-task neural network 103 indicate that the post is toxic and is directed to a particular group of people. In this example, the criteria used to add posts to the moderation log 104 is based on the toxicity prediction and an identity prediction. As another example, the content moderation system 101 may be configured to add a post in the moderation log 104 if the outputs of the multi-task neural network 103 indicate that the post is directed to a particular topic and expresses a negative sentiment. In this example, the criteria used to add posts to the moderation log 104 is based on a topic prediction and a sentiment prediction. The criteria used to make a determination whether posts should be added to moderation log 104 may be adjusted by operators of the content moderation system 101.

In some implementations, the moderation log 104 may be configured to rank posts based on the generated outputs. For example, the toxicity predictions generated by the multi-task neural network 103 may be scores which may be used to rank and prioritize posts in the moderation log 104. In this way, the moderation log 104 may be considered to comprise a moderation queue.

Different sets of criteria may be utilized to perform different actions on posts. For example, the content moderation system 101 may be configured to add a post to moderation log 104 and indicate that the post should be deleted based on a first set of criteria applied to the outputs generated for the post by the multi-task neural network 103. A second set of criteria may be applied to the outputs generated for a post by the multi-task neural network 103 which, if satisfied, cause the post to be added to moderation log 104 and indicate that the post requires manual review. The outcome of a manual review may also be associated with the post in moderation log 104, e.g. an indication as to whether the manual review determined the post was toxic or non-toxic, in addition to information relating to one or more attributes for the post if appropriate. Data stored in the moderation log 104 may be used to form training data 107 and may be used to refine/update the trained multi-task neural network 103. For example, if a number of posts contain a new term that is now considered to be a profanity (e.g. one which the multi-task neural network 103 was not initially trained to detect), this information can be added to moderation log 104 and used to form training data 107 for refining the multi-task neural network 103. For example, posts containing the new term may be indicated as containing profanity in the moderation log 104.

Training system 105 comprises a task discriminator 106, training data 107, and model trainer 108. Training system 105 is used or otherwise accessed when training/updating the multi-task neural network 103. The process of training the multi-task neural network 103 is described in greater detail in relation to FIG. 3. During training/refining the model trainer 108 receives one or more training examples from training data 107, and causes the multi-task neural network 103 to process the training examples and generate outputs in accordance with a current set of parameters. Model trainer 108 calculates parameter updates for the multi-task neural network 103 based on a comparison of the generated outputs to one or more target outputs for the training example(s) and adjusts the current set of parameters of the multi-task neural network 103 in accordance with the calculated parameter updates to generate an updated set of parameters for the multi-task neural network 103.

The task discriminator 106 comprises a neural network used during training of multi-task neural network 103. In particular, the task discriminator 106 is used to aim to ensure that feature representations of the user-generated textual content that are shared between tasks do not contain any task-specific information. During training of the multi-task neural network 103, parameters of the task discriminator 106 are also updated as will be explained in relation to FIG. 3.

FIGS. 2A and 2B each illustrate an example method 200 of using a multi-task neural network 202 for toxicity detection. FIG. 2A illustrates an example multi-task neural network 202 that has been trained to generate a toxicity prediction 203 and a prediction 204-1-204-N for each of N other attributes. FIG. 2B illustrates a particular example multi-task neural network 202 that has been trained to generate a toxicity prediction 203, in addition to a profanity prediction 204-1 and an identity prediction 204-2.

Turning to example of FIG. 2A, multi-task neural network 202 receives input data comprising a representation of user-generated textual content 201. The user-generated textual content 201 may be pre-processed to form the input data to the multi-task neural network 202. This may include tokenization of the user-generated textual content 201, including the addition of reserved tokens which are processed to generate a fixed-length representation (e.g. a vector of a particular size) of the textual content 201, sequence padding using reserved padding tokens, sequence trimming to fit a desired sequence length, and/or any other suitable pre-processing operation. Generally, the input data to the multi-task neural network 202 is a sequence of vectors, each vector corresponding to a particular token of the textual content 201 and one or more reserved tokens if appropriate. The tokens of the textual content 201 may correspond to any suitable constituent of the textual content, e.g. words, characters, morphemes, etc. Each vector of the sequence may be of the same size/dimension, and a matrix formed from the vectors may be used to represent the textual content 201.

The multi-task neural network 202 is a neural network comprising a plurality of neural network layers. The neural network layers may include linear projection layers followed by a non-linear activation function, convolutional layers, layer normalization layers, dropout layers, or any other suitable neural network layer. Generally, a neural network layer is associated with a set of parameters that are used when processing an input to the neural network layer to generate an output for the layer. The multi-task neural network 202 may comprise one or more Transformer encoder blocks and self-attention mechanisms used in Transformer-based architectures.

In some implementations, the multi-task neural network 202 is a feedforward neural network (e.g. a neural network that does not contain recurrent layers). This may utilize fewer computational resources (e.g. memory) than neural networks used for toxicity prediction that do utilize recurrent connections in recurrent layers. This may be advantageous in certain applications, such as those where it is desired to perform toxicity detection for a large number of posts in substantially real-time, as generally outputs can be provided quicker in feedforward neural networks than in neural networks utilizing recurrent layers.

In the example of FIG. 2A, the multi-task neural network 202 processes the input data and generates a toxicity prediction 203 in addition to a prediction 204 for each of N other attributes. It will be appreciated that N may be any positive integer, including one.

The form of the output generated by the multi-task neural network 202 for a particular attribute may depend on the particular attribute being predicted. For example, the toxicity prediction 203 may be a binary output, with 0 or another FALSE value indicating the absence of toxicity in the textual content 201 and 1 or another TRUE value indicating the presence of toxicity in the textual content. Additionally or alternatively, the toxicity prediction 203 may be a score indicating how likely it is that the textual content 201 is toxic. If the multi-task neural network 202 outputs a score as the toxicity prediction 203, an indication that the textual content 201 is toxic may be determined by comparing the score to a threshold. For example, textual content 201 with a toxicity score above the threshold may be considered to be toxic, and those with toxicity scores below the threshold may be considered to be non-toxic. This can be applied to any attribute representing a binary variable (e.g. the presence of sarcasm, the presence of a joke, etc.).

For attributes representing a categorical variable such as topic, identity, the prediction 204 for the attribute may be an indication of a particular class from a set of classes and/or a vector of scores comprising a score for each class in the set of classes. Where a prediction is a vector of scores is output as the prediction 204, any suitable criteria may be used to indicate a particular class from the set of classes. For example, the use of a threshold as described above may be used to determine that an attribute of the textual content belongs in the class. Additionally or alternatively, a highest scoring class from the set of classes may be selected.

FIG. 2B shows a more detailed example of a particular implementation of the multi-task neural network 202. In this example, the multi-task neural network 202 is configured to generate a toxicity prediction 203, in addition to a profanity prediction 204-1 and an identity prediction 204-2.

In this example, the multi-task neural network 202 comprises a number of feature extractors 205, one for each of the attributes being predicted (including toxicity) in addition to a common feature extractor 205-1, and output layers 206 comprising an output portion 207 for each of the attributes. The multi-task neural network 202 may be considered to include an attribute-specific branch for each of the attributes. For example, toxicity feature extractor 205-2 and toxicity output portion 207-1 may be considered to be a toxicity branch, profanity feature extractor 205-3 and profanity output portion 207-2 may be considered a profanity branch, and identity feature extractor 205-4 and identity output portion 207-3 may be an identity branch.

Input data comprising a representation of user-generated textual content 201 is received by the multi-task neural network 202. In some implementations, the input data may be processed by a language encoder to generate representations of the textual content 201 that is used for each of the feature extractors 205. Such a language encoder may be referred to herein as an initial encoder. The initial encoder comprises one or more neural network layers/blocks.

For example, the initial encoder may comprise a number of Transformer encoder blocks, e.g. BERT or XLMR. A Transformer encoder block comprises a self-attention mechanism operating on a sequence of input tokens to the block. In a self-attention mechanism, a number of key vectors, query vectors, and value vectors are determined for each of the input tokens. For each input token, the respective query vectors of the input token are compared to the key vectors of each of the input tokens to generate a weight (e.g. by dot product). To generate an output for the input token, a sum of the value vectors of each of the input tokens is performed, weighted using the respective generated weights for the input tokens. Where the initial encoder comprises a number of Transformer encoder blocks, the input data comprising a representation of user-generated textual content 201 may be prepended with a reserved token that is processed by the initial encoder to generate a fixed-length representation (e.g. a vector of a particular size/dimension) of the textual content 201. For example, a vector produced by one or more of the Transformer encoder blocks from processing the reserved token may be used to output an initial encoding for the textual content 201.

The input data comprising a representation of user-generated textual content 201 and/or the output of an initial encoder, if provided, is received by each of the feature extractors 205. Each feature extractor 205 comprises one or more neural network layers. The neural network layers may include linear projection layers followed by a non-linear activation function, convolutional layers, layer normalization layers, dropout layers, or any other suitable neural network layer. In one example, each feature extractor 205 comprises a number of feedforward blocks, each feedforward block comprising a layer normalization layer, followed by a linear projection layer with a non-linear activation function, followed by a dropout layer. Each feature extractor 205 may also be referred to as projection layer(s).

Generally, a feature extractor 205 is a portion of the multi-task neural network that generates feature representations from an input to the feature extractor (e.g. an initial encoding generated by an initial encoder). Typically, a feature representation is a fixed-length representation of the input. For example, a feature extractor 205 may generate a feature representation in the form of a vector representing various characteristics of the textual content 201.

The common feature extractor 205-1 is a feature extractor that has been trained to generate feature representations of the textual content 201 that is useful for each of the tasks but does not contain information that is particular to any one or more of the tasks. The tasks in the example of FIG. 2B are toxicity detection, profanity detection, and identity detection. The common feature extractor 205-1 may also be referred to as a task-common feature extractor as it generates feature representations that are useful for all of the tasks.

The toxicity feature extractor 205-2 is a feature extractor that has been trained to generate feature representations of the textual content 201 that is useful for toxicity detection only. In other words, the feature representations generated by the toxicity feature extractor 205-2 are such that that they contain minimal information that is useful for profanity detection or identity detection. Similarly, the profanity feature extractor 205-3 is a feature extractor that has been trained to generate feature representations of the textual content 201 that is useful for profanity detection only, and identity feature extractor 205-2 is a feature extractor that has been trained to generate feature representations of the textual content 201 that is useful for identity detection only. Feature extractors 205-2, 205-3, 205-4 may be referred to as task-specific feature extractors as they generate feature representations that are useful only for their respective tasks. As the task-specific feature extractors each relate to a different attribute (e.g. toxicity, profanity, identity), they may also be referred to as attribute feature extractors.

In this way, the multi-task neural network 202 can generate disentangled representations of textual content 201 that are particular to each task. This can mitigate biases such as the learning of false causal relationships between tasks (such as determining that any textual content 201 containing profanity is also toxic), while also generating representations that are useful for all of the tasks through the common feature extractor 205-1. Each of the feature extractors 205 may be configured to output an feature representation that are of the same size/dimension.

The multi-task neural network 202 comprises output layers 206 comprising a number of output portions 207 configured to output the predictions 203, 204. Each of the output portions 207 comprise one or more neural network layers. The neural network layers may include linear projection layers followed by a non-linear activation function, convolutional layers, layer normalization layers, dropout layers, or any other suitable neural network layer. In one example, each output portion 207 comprises a linear projection layer with a non-linear activation function, followed by a dropout layer, followed by a final linear layer that generates an output for the output portion 207. The output portions 207 are configured to generate an output of a size that is appropriate for the task being performed. For example, for toxicity detection, the toxicity prediction 203 may be a score indicating the toxicity of the textual content 201. For identity detection, the identity prediction 204-2 may be a vector of scores comprising a score for each identity of a set of identities. Each output portion 207 is associated with a different task/attribute of the plurality of tasks/attributes.

Toxicity output portion 207-1 receives a common feature representation generated by the common feature extractor 205-1 in addition to the toxicity feature representation generated by the toxicity feature extractor 205-2. The common feature representation and the toxicity feature representation are combined using any suitable combining operation such as concatenation, addition, etc., to generate a combined feature representation for the toxicity output portion 207-1. The combined feature representation is processed by the toxicity output portion 207-1 to generate the toxicity prediction 203.

Profanity output portion 207-2 receives a common feature representation generated by the common feature extractor 205-1 in addition to the profanity feature representation generated by the profanity feature extractor 205-3. The common feature representation and the profanity feature representation are combined using any suitable combining operation such as concatenation, addition, etc, to generate a combined feature representation for the profanity output portion 207-2. The combined feature representation is processed by the profanity output portion 207-2 to generate the profanity prediction 204-1.

Identity output portion 207-3 receives a common feature representation generated by the common feature extractor 205-1 in addition to the identity feature representation generated by the identity feature extractor 205-4. The common feature representation and the identity feature representation are combined using any suitable combining operation such as concatenation, addition, etc., to generate a combined feature representation for the identity output portion 207-3. The combined feature representation is processed by the identity output portion 207-3 to generate the identity prediction 204-2.

A decision 208 on a post comprising the user-generated textual content can be made based on the predictions 203, 204 generated by the multi-task neural network. Different sets of criteria may be utilized to perform different actions on posts. For example, a determination may be made that the post should be deleted based on a first set of criteria applied to the predictions 203, 204 generated for the textual content 201 by the multi-task neural network 202. A second set of criteria may be applied to the generated predictions 203, 204 which, if satisfied, indicate that the post requires manual review. The criteria used to make decision 208 may be adjusted, e.g. to reduce the number of posts that are falsely determined as requiring an action (e.g. deletion/manual review), and/or to increase the number of posts that are falsely determined as not requiring an action.

For example, a decision 208 may be made to delete posts if the predictions 203, 204 generated by the multi-task neural network 202 indicate that the post is toxic and is directed to a particular group of people. In this example, the first set of criteria used to determine whether posts should be deleted is based on the toxicity prediction 203 and the identity prediction 204-2. As another example, a decision 208 may be made that a post requires manual review if the predictions 203, 204 generated by the multi-task neural network 103 indicate that the post is toxic even though it does not contain a profanity. In this example, the second set of criteria used to determine whether posts require manual review is based on the toxicity prediction 203 and the profanity prediction 204-1. The criteria used to make decision 208 may be based on any appropriate predictions generated by the multi-task neural network 202. For example, the criteria for some decisions 208 may be based on only the toxicity predictions 203, whereas the criteria for other decisions 208 may disregard the toxicity predictions 203.

Figure 3:
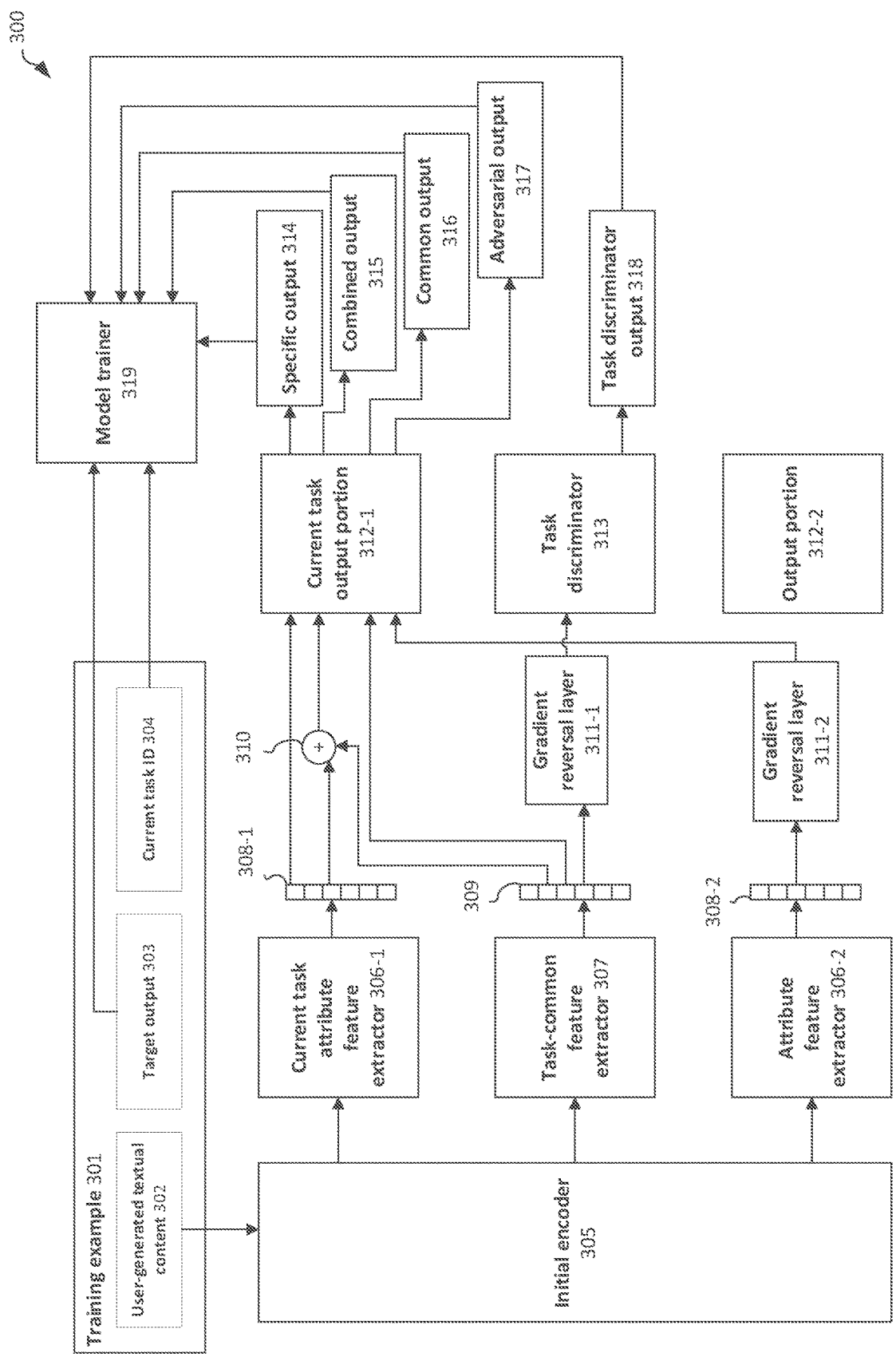
FIG. 3 illustrates an example method of training a multi-task neural network to perform toxicity detection.

FIG. 3 illustrates an example method 300 of training a multi-task neural network to perform toxicity detection. For ease of illustration, the multi-task neural network is shown as being trained to perform two tasks, one of which being toxicity detection, although it will be appreciated that the multi-task neural network may be trained to perform any suitable number of tasks. In addition, for ease of illustration, only a single training example 301 is shown in FIG. 3, but it will be appreciated that any number of training examples 301 may be used at each training step.

During training, the multi-task neural network receives a number of training examples 301. Over the course of training, a number of training steps are performed using the training examples 301. For a training step, the multi-task neural network is being trained to perform one of the plurality tasks. The task that the multi-task neural network is being trained to perform at the training step is selected e.g. by random selection and/or according to a schedule, and a number of training examples 301 are provided to train the multi-task neural network to perform the selected task. For example, the task being trained in the training step shown in FIG. 3 may be toxicity detection, and the task being trained in the subsequent training step may be profanity detection.

The training examples 301 for the training step may be obtained from a training dataset. The training dataset may include training examples 301 that include target outputs 303 for each of the tasks that the multi-task neural network is being trained to perform over the course of training. Additionally or alternatively, some of the training examples 301 of the training dataset may only include target outputs 303 for a subset of the tasks. These training examples 301 may be used only when the selected task for the training step is included in the subset of tasks.

The goal during training is to learn trained attribute feature extractors 306 that generate attribute feature representations 308 that are only useful for their respective tasks, a task-common feature extractor 307 that generates common feature representations 309 that are useful for all of the tasks without containing information for any particular subset of the tasks, and output portions 312 that can accurately map input feature representations to target outputs 303 included in the training examples 301.

Each training example 301 comprises a representation of user-generated textual content 302, a target output 303 for the selected task of the current training step (e.g. the current task), and a current task identifier 304 indicating the current task from the plurality of tasks. The current task identifier 304 may be omitted when storing the training example 301, and may be generated when needed during training.

Input data for the multi-task neural network is generated using the representation of user-generated textual content 302. The user-generated textual content 302 may be pre-processed to form the input data to the multi-task neural network. This may include tokenization of the user-generated textual content 302, including the addition of reserved tokens which are processed to generate a fixed-length representation (e.g. a vector of a particular size) of the textual content 302, sequence padding using reserved padding tokens, sequence trimming to fit a desired sequence length, and/or any other suitable pre-processing operation. Generally, the input data to the multi-task neural network is a sequence of vectors, each vector corresponding to a particular token of the textual content 302 and one or more reserved tokens if appropriate. The tokens of the textual content 302 may correspond to any suitable constituent of the textual content 302, e.g. words, characters, morphemes, etc. Each vector of the sequence may be of the same size/dimension, and a matrix formed from the vectors may be used to form the input data.

The target output 303 comprises a desired output relating to the current task for the multi-task neural network to generate from processing the input data determined for the training example 301. For example, if the current task for the training step is toxicity detection, the target output 303 may comprise a toxicity target output (or label) indicating whether the user generated textual content 302 is toxic or not. As another example, if the current task for the training step is identity detection, the target output 303 may comprise an identity target output (or label) indicating a particular identity from a set of identities, and/or the absence of any of the identities in the set.

The current task identifier 304 is used to indicate the current task for the training step from the plurality of tasks. For example, one current task identifier 304 may be used to indicate that the current task is toxicity detection, another current task identifier 304 may be used to indicate that the current task is profanity detection, etc. The current task identifier 304 may comprise a one-hot vector wherein each element of the vector corresponds to a different task of the plurality of tasks.

Input data comprising a representation of the user-generated textual content 302 is received by the initial encoder 305 of the multi-task neural network. The initial encoder 305 processes the input data in accordance with a current set of parameters and generates an initial encoding. The initial encoding is a representation of the textual content 302 that is processed by each of the feature extractors 306-1, 306-2, 307 of the multi-task neural network.

The initial encoder 305 comprises neural network layers/blocks. For example, the initial encoder 305 may comprise a number of Transformer encoder blocks. A Transformer encoder block comprises a self-attention mechanism operating on a sequence of input tokens to the block. In a self-attention mechanism, a number of key vectors, query vectors, and value vectors are determined for each of the input tokens. For each input token, the respective query vectors of the input token are compared to the key vectors of each of the input tokens to generate a weight (e.g. by dot product). To generate an output for the input token, a sum of the value vectors of each of the input tokens is performed, weighted using the respective generated weights for the input tokens. Where the initial encoder 305 comprises a number of Transformer encoder blocks, the input data comprising a representation of user-generated textual content 302 may be prepended with a reserved token that is processed by the initial encoder to generate an initial encoding that is a fixed-length representation (e.g. a vector of a particular size/dimension) of the textual content 302. For example, a vector produced by one or more of the Transformer encoder blocks from processing the reserved token may be used to output an initial encoding for the textual content 302.

The initial encoding generated by the initial encoder 305 is received by task-common feature extractor 307. The task-common feature extractor 307 processes the initial encoding in accordance with a current set of parameters and generates a common feature representation 309.

As described in relation to FIG. 2B, the multi-task neural network includes an attribute feature extractor/task-specific feature extractor 306 for each of the attributes being identified in the various tasks. As such, one of the attribute feature extractors 306 is a current task attribute feature extractor 306-1. Similarly, one of the output portions 312 is a current task output portion 312-1.

The initial encoding generated by the initial encoder 305 is received by current task attribute feature extractor 306-1. The current task attribute feature extractor 306-1 processes the initial encoding in accordance with a current set of parameters and generates attribute feature representation 308-1.

The initial encoding generated by the initial encoder 305 is also received by attribute feature extractors 306-2 that are not the current task attribute feature extractor 306-1. The attribute feature extractor 306-2 processes the initial encoding in accordance with a current set of parameters and generates attribute feature representation 308-2.

The current task output portion 312-1 receives a number of inputs and generates an output for each of the received inputs.

The attribute feature representation 308-1 generated by the current task attribute feature extractor 306-1 is received by the current task output portion 312-1. The current task output portion 312-1 processes the attribute feature representation 308-1 in accordance with a current set of parameters and generates a specific output 314. The output 314 may be referred to as a specific output (or task-specific output) as this output is generated by processing the attribute feature representation 308-1 generated by the current task attribute feature extractor 306-1 without using the common feature representation 309 or attribute feature representations 308-2 generated by attribute feature extractors 306-2 that are not the current task attribute feature extractor 306-1. In other words, the input received by the current task output portion 312-1 to generate the specific output 314 depends on information that is specific to the current task only.

The attribute feature representation 308-1 generated by the current task attribute feature extractor 306-1 and the common feature representation 309 generated by task-common feature extractor 307 is received at combining operation 310. The combining operation 310 may be any suitable combining operation such as addition, concatenation, etc. The combining operation 310 combines the attribute feature representation 308-1 and common feature representation 309 and generates a combined feature representation.

The combined feature representation is received by the current task output portion 312-1. The current task output portion 312-1 processes the combined feature representation in accordance with a current set of parameters and generates a combined output 315. The output 315 may be referred to as a combined output as this output is generated by processing the combined feature representation formed from combining the attribute feature representation 308-1 generated by the current task attribute feature extractor 306-1 and the common feature representation 309.

The common feature representation 309 generated by the task-common feature extractor 307 is received by the current task output portion 312-1. The current task output portion 312-1 processes the common feature representation 309 in accordance with a current set of parameters and generates a common output 316. The output 316 may be referred to as a common output as this output is generated by processing the common feature representation 309 without using the attribute feature representation 308-1 generated by the current task attribute feature extractor 306-1 or attribute feature representations 308-2 generated by attribute feature extractors 306-2 that are not the current task attribute feature extractor 306-1.

Attribute feature representations 308-2 generated by attribute feature extractors 306-2 that are not the current task attribute feature extractor 306-1 are received at a gradient reversal layer 311-2. During a forward pass of the multi-task neural network (e.g. when determining predicted outputs for training example 301), a gradient reversal layer 311 applies no transformation to its received inputs. In other words, during a forward pass, a gradient reversal layer 311 provides its received inputs as outputs. During a backwards pass of the multi-task neural network (e.g. when determining parameter updates using backpropagation), the gradient reversal layer 311 multiplies received gradients by a negative constant value. Typically, gradients are received from a layer that processes the output of the gradient reversal layer 311 during the forward pass.

The output of gradient reversal layer 311-2 (in this case, attribute feature representation 308-2) is received by current task output portion 312-1. The current task output portion 312-1 processes the attribute feature representation 308-2 in accordance with a current set of parameters and generates an adversarial output 317. The output 317 may be referred to as an adversarial output as this output is generated by processing attribute feature representations 308-2 generated by attribute feature extractors 306-2 that are not the current task attribute feature extractor 306-1 without using the attribute feature representation 308-1 generated by the current task attribute feature extractor 306-1 or the common feature representation 309. Although only a single adversarial output 317 is illustrated in FIG. 3, it will be appreciated that an adversarial output 317 may be generated as described above for every attribute feature representation 308-2 generated by attribute feature extractors 306-2 that are not the current task attribute feature extractor 306-1.

The common feature representation 309 generated by the task-common feature extractor 307 is also received by gradient reversal layer 311-1. A task discriminator 313 receives the output of the gradient reversal layer 311-1 which in this case, is the common feature representation 309. The task discriminator 313 processes the common feature representation 309 in accordance with a current set of parameters and generates a task discriminator output 318. The task discriminator output 318 represents a prediction of which task the multi-task neural network is currently being trained to perform in the training step.

The task discriminator 313 comprises neural network layers. The neural network layers may include linear projection layers followed by a non-linear activation function, convolutional layers, layer normalization layers, dropout layers, or any other suitable neural network layer. The task discriminator 313 may comprise a number of feedforward blocks, followed by an output portion. Each feedforward block may comprise a layer normalization layer, followed by a linear projection layer with a non-linear activation function, followed by a dropout layer. The output portion of the task discriminator 313 may be configured to generate an output for each task of the plurality of tasks, e.g. a score for each of the plurality of tasks indicating the likelihood that the task is the current task being trained in the training step.

Model trainer 319 receives outputs 314-318 generated for the training example 301 and calculates an objective function comprising one or more loss functions using the outputs 314-318, target outputs 303, and current task identifier 304. The objective function is used by the model trainer 319 to determine parameter updates for the multi-task neural network, e.g. by using an optimization procedure to optimize the objective function. For example, the objective function may be optimized using gradient-based methods such as stochastic gradient descent, mini-batch gradient descent, or batch gradient descent, including momentum-based methods such as Adam, RMSProp, and AdaGrad.

The objective function may comprise a loss function which compares the specific output 314 to the target output 303. The purpose of this loss function is to train the multi-task neural network to generate the specific output 314 to be similar to the target output 303. In particular, the current task attribute feature extractor 306-1 is trained to generate an attribute feature representation 308-1 that performs well for the current task. The loss function may be a cross-entropy loss, a logistic loss, a negative log-likelihood or any other suitable loss function. As this loss function depends on the specific output 314, this loss function may be referred to as a specific loss (or task-specific loss), denoted $L_{spec}$.

Training using the specific loss comprises updating parameters of the multi-task neural network to minimize a measure of difference between the specific output 314 and the target output 303 for the current task. This may comprise updating parameters of the current task attribute feature extractor 306-1 and the output portion 312-1 of the multi-task neural network associated with the current task. This may further comprise updating parameters of the initial encoder 305.

The objective function may comprise a loss function which compares the combined output 315 to the target output 303. The purpose of this loss function is to train the current task attribute feature extractor 306-1 to generate an attribute feature representation 308-1 that performs well for the current task, and the task-common feature extractor 307 to generate a common feature representation 309 that contains information useful for the task. The loss function may be a cross-entropy loss, a logistic loss, a negative log-likelihood or any other suitable loss function. As this loss function depends on the combined output 315, this loss function may be referred to as a combined loss, denoted $L_{comb}$.

Training using the combined loss comprises updating parameters of the multi-task neural network to minimize a measure of difference between the combined output 315 and the target output 303 for the current task. This may comprise updating parameters of the current task attribute feature extractor 306-1 and the task-common feature extractor 307. This may further comprise updating parameters of the current task output portion 312-1 and/or initial encoder 305.

The objective function may comprise a loss function which compares the common output 316 to the target output 303. The purpose of this loss function is to train the task-common feature extractor 307 to generate a common feature representation 309 that contains information useful for all of the tasks. The loss function may be a cross-entropy loss, a logistic loss, a negative log-likelihood or any other suitable loss function. As this loss function depends on the common output 316, this loss function may be referred to as a common loss, denoted $L_{common}$.

Training using the common loss comprises updating parameters of the multi-task neural network to minimize a measure of difference between the common output 316 and the target output 303 for the current task. This may comprise updating parameters of the task-common feature extractor 307. This may further comprise updating parameters of the current task output portion 312-1 and/or initial encoder 305.

The objective function may comprise a loss function which compares adversarial outputs 317 to the target output 303. The purpose of this loss function is to train the multi-task neural network to generate attribute feature representations 308 that are only useful for their relevant tasks. In particular, for the training step illustrated in FIG. 3, attribute encoder 306-2 is trained to generate an attribute feature representation 308-2, which when processed by current task output portion 312-1, leads to an adversarial output 317 that is not similar to the target output 303. This is achieved using gradient reversal layer 311-2 between attribute feature extractor 306-2 and current task output portion 312-1. The loss function may be a cross-entropy loss, a logistic loss, a negative log-likelihood or any other suitable loss function. As this loss function depends on the adversarial output 317, this loss function may be referred to as an adversarial loss, denoted $L_{adv}$.

Training using the adversarial loss comprises updating parameters of the multi-task neural network to maximize a measure of difference between each of the one or more adversarial outputs 317 and the target output 303 for the current task. This may comprise updating parameters of attribute feature extractors 306-2 that are not the current task attribute feature extractor 306-1. This may also comprise updating parameters of the current task output portion 312-1.

The objective function may comprise a loss function which compares the task discriminator output 318 to the current task identifier 304. The purpose of this loss function is to train the multi-task neural network to generate common feature representations 309 which do not contain information about any particular task, or subset of tasks. In particular, the task-common feature extractor 307 is trained to generate a common feature representation 309, which when processed by the task discriminator 313, leads to a task discriminator output 318 that is not similar to the current task identifier 304. This is achieved using gradient reversal layer 311-1 between task-common feature extractor 307 and task discriminator 313. The loss function may be a cross-entropy loss, a logistic loss, a negative log-likelihood or any other suitable loss function. As this loss function depends on the task discriminator output 318, this loss function may be referred to as a discriminator loss, denoted $L_D$.

Training using the discriminator loss comprises updating parameters of the multi-task neural network to maximize a measure of difference between the task discriminator output 318 and a current task identifier 304 indicating the current task. This may comprise updating parameters of the task-common feature extractor 307. Parameters of the task discriminator 313 may also be updated using the discriminator loss. Parameters of the task discriminator 313 may be updated to minimize the measure of difference between the task discriminator output 318 and the current task identifier.

The objective function being optimized may comprise any combination of the above-described loss functions. For example, an objective function may be provided as a weighted combination of each of the loss functions. Additionally or alternatively, one or more of the loss functions may be omitted in the objective function. Furthermore, the objective function may comprise additional loss functions such as regularization loss functions.

One example objective function may be provided as below, where $\alpha_1$, $\alpha_2$ are hyper-parameters which may be fine-tuned (e.g. by testing performance of a trained multi-task neural network on held-out data):

$$L = L_{spec} + L_{comb} + L_{common} - \alpha_1 L_{adv} - \alpha_2 L_D$$

The objective function is optimized using an optimization procedure to determine parameter updates for the multi-task neural network. Parameter updates may be applied to portions of the multi-task neural network. For example, the parameters of output portions 312-2 that are not the current task output portion 312-1 may be held fixed and not updated during the training step. In some implementations, parameters of the initial encoder 305 may be updated using any loss apart from the adversarial loss $L_{adv}$.

The training process is iteratively performed for a number of training steps until a termination criteria is reached. For example, training may be terminated after a certain number of training steps, after processing of a certain number of training examples, and/or based on one or more performance measures (e.g. accuracy of predictions on a held-out "unseen" data set). After training is complete, a trained multi-task neural network may be provided from the initial encoder 305, attribute feature extractors 306, task-common feature extractor 307, and output portions 312.

Figure 4:
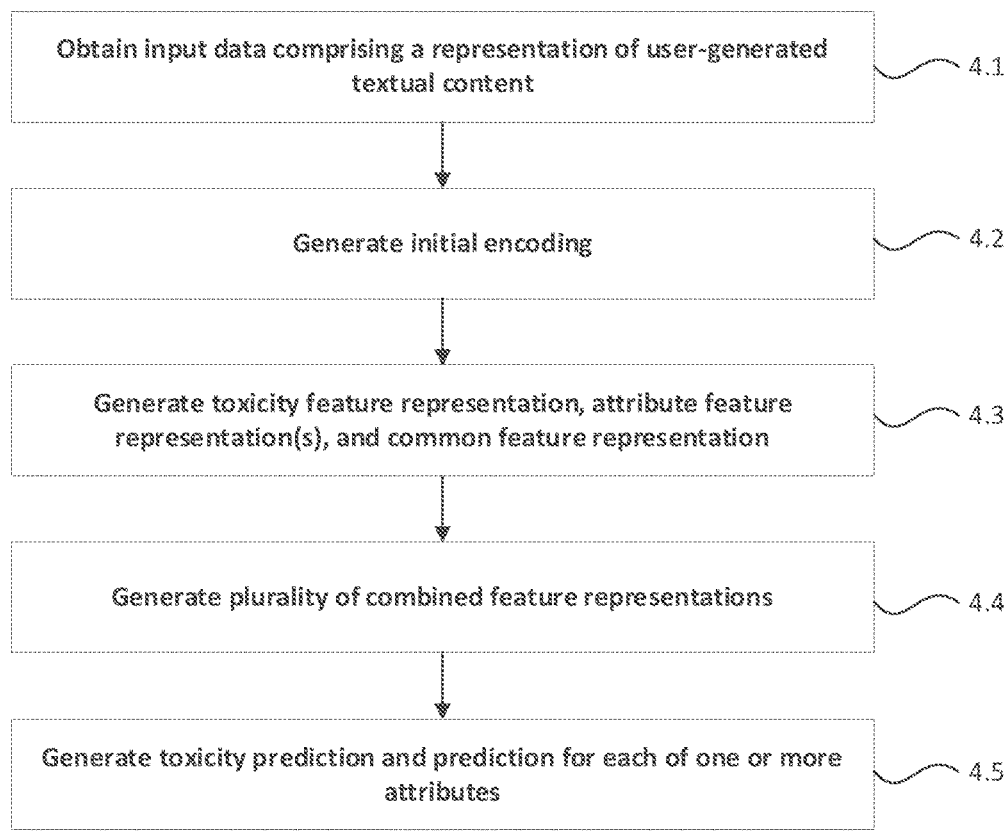
FIG. 4 is a flow diagram illustrating an example method for detecting toxic user-generated textual content.

FIG. 4 is a flow diagram illustrating an example method 400 for detecting toxic user-generated textual content.

In step 4.1, input data comprising a representation of user-generated textual content is obtained.

In step 4.2, an initial encoding is generated. The initial encoding is generated by processing the input data using an initial encoder of a multi-task neural network. The initial encoder may comprise a pre-trained Transformer-based language model.

In step 4.3, a toxicity feature representation, an attribute feature representation for each of one or more attributes, and a common feature representation are generated. The toxicity feature representation is generated by processing the initial encoding using a task-specific toxicity feature extractor of the multi-task neural network. The attribute feature representation for an attribute is generated by processing the initial encoding using a respective task-specific attribute feature extractor of the multi-task neural network associated with the attribute. The common feature representation is generated by processing the initial encoding using a task-common feature extractor of the multi-task neural network.

The one or more attributes for the user-generated textual content comprise a representation for one or more of: presence of profanity; topic class; sentiment; group identity class; presence of a joke; presence of sarcasm; and presence of an idiom. One or more attributes may be omitted from this list, and/or one or more further attributes may be present in this list.

In step 4.4, a plurality of combined feature representations is generated. The plurality of combined feature representations is generated by combining each of the toxicity feature representation and the one or more attribute feature representations with the common feature representation.

In step 4.5, a toxicity prediction and a prediction for each of the one or more attributes are generated. The toxicity prediction is generated by processing, using a toxicity output portion of the multi-task neural network, the combined feature representation formed from combining the toxicity feature representation with the common feature representation. The prediction for an attribute is generated by processing, using a respective output portion of the multi-task neural network associated with the attribute, the combined feature representation formed from combining the attribute feature representation for the attribute with the common feature representation.

The toxicity prediction may comprise a score indicating a probability of toxicity for the user-generated textual content. A plurality of posts comprising user-generated textual content may be stored in a moderation queue, wherein the posts are ranked in the moderation queue by the score for the toxicity prediction generated by the multi-task neural network.

One or more of the task-specific feature extractors, the task-common feature extractor, and the output portions may comprise one or more feedforward blocks. Each feedforward block may comprise a linear projection layer, a non-linear activation function, and a dropout layer.

The method 400 may further comprise flagging a post comprising the user-generated textual content for moderation based on the toxicity prediction and/or the prediction for one or more of the attributes.

Figure 5:
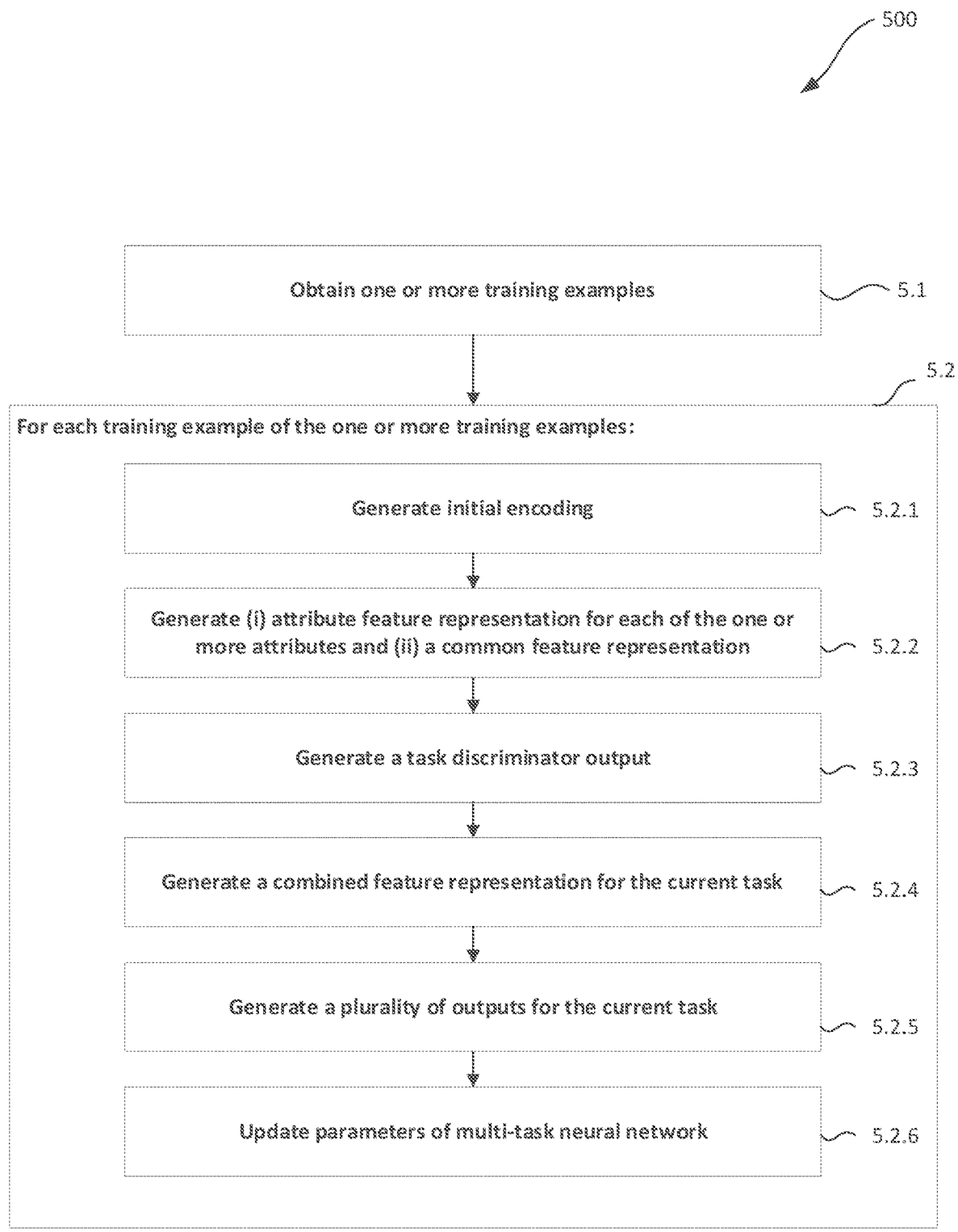
FIG. 5 is a flow diagram illustrating an example method for training a multi-task neural network to perform toxicity detection of user-generated textual content.

FIG. 5 is a flow diagram illustrating an example method 500 for training a multi-task neural network to perform toxicity detection of user-generated textual content.

In step 5.1, one or more training examples are obtained. Each training example comprises input data comprising a representation of user-generated textual content and a target output for each of one or more tasks out of a plurality of tasks. Each of the plurality of tasks is to identify a respective attribute in user-generated textual content, one of the attributes being toxicity.

Step 5.2 comprises steps 5.2.1 to 5.2.6 which are performed for each training example. This involves performing a training step to train the multi-task neural network on a current task of the plurality of tasks.

In step 5.2.1, an initial encoding is generated. The initial encoding is generated by processing the input data using an initial encoder of the multi-task neural network.

In step 5.2.2, an attribute feature representation for each of the one or more attributes and a common feature representation are generated. The attribute feature representation for an attribute is generated by processing the initial encoding using a respective attribute feature extractor of the multi-task neural network associated with the attribute. One of the attribute feature representations is a current task attribute feature representation for the current task that is generated by a current task attribute feature extractor. The common feature representation is generated by processing the initial encoding using a task-common feature extractor of the multi-task neural network.

In step 5.2.3, a task discriminator output is generated. The task discriminator output represents a prediction of which task the multi-task neural network is currently being trained to perform in the training step. The task discriminator output is generated by processing the common feature representation using a gradient reversal layer and a task discriminator.

In step 5.2.4, a combined feature representation is generated for the current task. The combined feature representation is generated by combining the current task attribute feature representation with the common feature representation.

In step 5.2.5, a plurality of outputs are generated for the current task. The plurality of outputs are generated by an output portion of the multi-task neural network associated with the current task. A specific output is generated by processing the current task attribute feature representation. A combined output is generated by processing the combined feature representation. One or more adversarial outputs are each generated by processing an attribute feature representation that is not the current task attribute feature representation using a gradient reversal layer. A common output may be generated by processing the common feature representation.

In step 5.2.6, parameters of the multi-task neural network are updated. Parameters of the multi-task neural network are updated to minimize: (i) a measure of difference between the specific output and the target output for the current task (ii) minimize a measure of difference between the combined output and the target output for the current task, (iii) maximize a measure of difference between each of the one or more adversarial outputs and the target output for the current task, and (iv) maximize a measure of difference between the task discriminator output and a current task identifier indicating the current task.

Updating parameters of the multi-task neural network to minimize the measure of difference between the specific output and the target output for the current task may comprise updating parameters of the current task attribute feature extractor and the output portion of the multi-task neural network associated with the current task.

Updating parameters of the multi-task neural network to minimize the measure of difference between the combined output and the target output for the current task may comprise updating parameters of the current task attribute feature extractor and the task-common feature extractor.

Updating parameters of the multi-task neural network to maximize the measure of difference between each of the one or more adversarial outputs and the target output for the current task may comprise updating parameters of each of the attribute feature extractors that are not the current task attribute feature extractor.

Updating parameters of the multi-task neural network to maximize the measure of difference between the task discriminator output and a current task identifier indicating the current task may comprise updating parameters of the task-common feature extractor.

Step 5.2.6 may also comprise updating parameters of the multi-task neural network to minimize a measure of difference between the common output and the target output for the task. This may comprise updating parameters of the task-common feature extractor.

The method 500 may further involve updating parameters of the task discriminator to minimize the measure of difference between the task discriminator output and the current task identifier.

Figure 6:
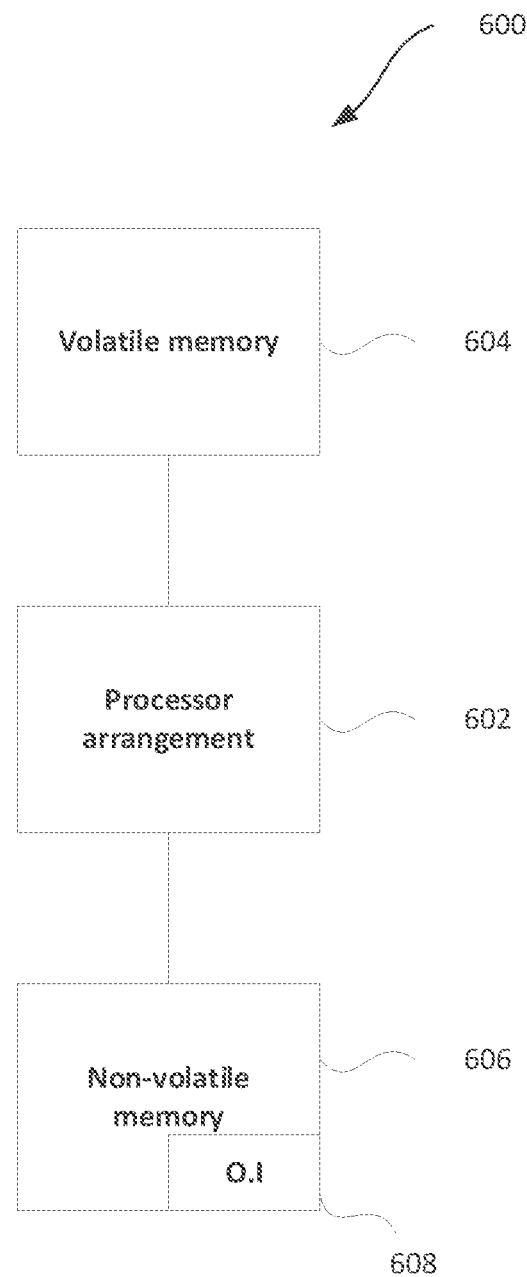
FIG. 6 shows a schematic example of a system/apparatus for performing any of the methods described herein.

FIG. 6 shows a schematic example of a system/apparatus 600 for performing any of the methods described herein. The system/apparatus shown is an example of a computing device. It will be appreciated by the skilled person that other types of computing devices/systems may alternatively be used to implement the methods described herein, such as a distributed computing system.

The apparatus (or system) 600 comprises one or more processors 602. The one or more processors control operation of other components of the system/apparatus 600. The one or more processors 602 may, for example, comprise a general purpose processor. The one or more processors 602 may be a single core device or a multiple core device. The one or more processors 602 may comprise a central processing unit (CPU) or a graphical processing unit (GPU). Alternatively, the one or more processors 602 may comprise specialised processing hardware, for instance a RISC processor or programmable hardware with embedded firmware. Multiple processors may be included.

The system/apparatus comprises a working or volatile memory 604. The one or more processors may access the volatile memory 604 in order to process data and may control the storage of data in memory. The volatile memory 604 may comprise RAM of any type, for example Static RAM (SRAM), Dynamic RAM (DRAM), or it may comprise Flash memory, such as an SD-Card.

The system/apparatus comprises a non-volatile memory 606. The non-volatile memory 606 stores a set of operation instructions 608 for controlling the operation of the processors 602 in the form of computer readable instructions. The non-volatile memory 606 may be a memory of any kind such as a Read Only Memory (ROM), a Flash memory or a magnetic drive memory.

The one or more processors 602 are configured to execute operating instructions 608 to cause the system/apparatus to perform any of the methods described herein. The operating instructions 608 may comprise code (i.e. drivers) relating to the hardware components of the system/apparatus 600, as well as code relating to the basic operation of the system/apparatus 600. Generally speaking, the one or more processors 602 execute one or more instructions of the operating instructions 608, which are stored permanently or semi-permanently in the non-volatile memory 606, using the volatile memory 604 to temporarily store data generated during execution of said operating instructions 608.

Implementations of the methods described herein may be realised as in digital electronic circuitry, integrated circuitry, specially designed ASICs (application specific integrated circuits), computer hardware, firmware, software, and/or combinations thereof. These may include computer program products (such as software stored on e.g. magnetic discs, optical disks, memory, Programmable Logic Devices) comprising computer readable instructions that, when executed by a computer, such as that described in relation to FIG. 6, cause the computer to perform one or more of the methods described herein.

Any system feature as described herein may also be provided as a method feature, and vice versa. As used herein, means plus function features may be expressed alternatively in terms of their corresponding structure. In particular, method aspects may be applied to system aspects, and vice versa.

Furthermore, any, some and/or all features in one aspect can be applied to any, some and/or all features in any other aspect, in any appropriate combination. It should also be appreciated that particular combinations of the various features described and defined in any aspects of the invention can be implemented and/or supplied and/or used independently.

Although several embodiments have been shown and described, it would be appreciated by those skilled in the art that changes may be made in these embodiments without departing from the principles of this disclosure, the scope of which is defined in the claims.

The invention claimed is:

1. A computer-implemented method for detecting toxic user-generated textual content, the method comprising:
obtaining input data comprising a representation of user-generated textual content; and
generating a toxicity prediction and a prediction for each of one or more attributes for the user-generated textual content by processing the input data using a multi-task neural network, the processing comprising:
generating an initial encoding for the user-generated textual content, comprising processing the input data using an initial encoder of the multi-task neural network;
generating a toxicity feature representation, comprising processing the initial encoding using a task-specific toxicity feature extractor of the multi-task neural network;
generating an attribute feature representation for each of the one or more attributes, comprising, for each attribute, processing the initial encoding using a respective task-specific attribute feature extractor of the multi-task neural network associated with the attribute;
generating a common feature representation, comprising processing the initial encoding using a task-common feature extractor of the multi-task neural network;
generating a plurality of combined feature representations, comprising combining each of the toxicity feature representation and the one or more attribute feature representations with the common feature representation;
generating the toxicity prediction by processing, using a toxicity output portion of the multi-task neural network, the combined feature representation formed from combining the toxicity feature representation with the common feature representation; and
generating the prediction for each of the one or more attributes by processing, using a respective output portion of the multi-task neural network associated with the attribute, the combined feature representation formed from combining the attribute feature representation for the attribute with the common feature representation.

2. The method of claim 1, further comprising flagging a post comprising the user-generated textual content for moderation based on the toxicity prediction and/or the prediction for one or more of the attributes.

3. The method of claim 1, wherein the toxicity prediction comprises a score indicating a probability of toxicity for the user-generated textual content.

4. The method of claim 3, further comprising:
storing a plurality of posts comprising user-generated textual content in a moderation queue, wherein the posts are ranked in the moderation queue by the score for the toxicity prediction generated by the multi-task neural network.

5. The method of claim 1, wherein the one or more attributes for the user-generated textual content comprise a representation for one or more of:
presence of profanity;
topic class;
sentiment;
group identity class;
presence of a joke;
presence of sarcasm; and
presence of an idiom.

6. The method of claim 1, wherein the initial encoder comprises a pre-trained Transformer-based language model.

7. The method of claim 1, wherein one or more of the task-specific feature extractors, the task-common feature extractor, and the output portions comprise one or more feedforward blocks, each feedforward block comprising a linear projection layer, a non-linear activation function, and a dropout layer.

8. A non-transitory computer-readable medium storing instructions, which when executed by a processor, cause the processor to:
obtain input data comprising a representation of user-generated textual content; and
generate a toxicity prediction and a prediction for each of one or more attributes for the user-generated textual content by processing the input data using a multi-task neural network, the processing comprising:
generating an initial encoding for the user-generated textual content, comprising processing the input data using an initial encoder of the multi-task neural network;
generating a toxicity feature representation, comprising processing the initial encoding using a task-specific toxicity feature extractor of the multi-task neural network;
generating an attribute feature representation for each of the one or more attributes, comprising, for each attribute, processing the initial encoding using a respective task-specific attribute feature extractor of the multi-task neural network associated with the attribute;
generating a common feature representation, comprising processing the initial encoding using a task-common feature extractor of the multi-task neural network;
generating a plurality of combined feature representations, comprising combining each of the toxicity feature representation and the one or more attribute feature representations with the common feature representation;
generating the toxicity prediction by processing, using a toxicity output portion of the multi-task neural network, the combined feature representation formed from combining the toxicity feature representation with the common feature representation; and
generating the prediction for each of the one or more attributes by processing, using a respective output portion of the multi-task neural network associated with the attribute, the combined feature representation formed from combining the attribute feature representation for the attribute with the common feature representation.

9. The non-transitory computer-readable medium of claim 8, wherein the one or more attributes for the user-generated textual content comprises a representation for one or more of:
presence of profanity;
topic class;
sentiment;
group identity class;
presence of a joke;
presence of sarcasm; and
presence of an idiom.

10. The non-transitory computer-readable medium of claim 8 storing further instructions, which when executed by the processor, cause the processor to flag a post comprising the user-generated textual content for moderation based on the toxicity prediction and/or the prediction for one or more of the attributes.

11. The non-transitory computer-readable medium of claim 8, wherein the toxicity prediction comprises a score indicating a probability of toxicity for the user-generated textual content.

12. The non-transitory computer-readable medium of claim 11 storing further instructions, which when executed by the processor, cause the processor to store a plurality of posts comprising user-generated textual content in a moderation queue, wherein the posts are ranked in the moderation queue by the score for the toxicity prediction generated by the multi-task neural network.

* * * * *